United States Patent Office 2,988,441
Patented June 13, 1961

2,988,441
PLANT GROWTH MEDIUM
Malcolm E. Pruitt, Lake Jackson, Tex., assignor to The Dow Chemical Company, Midland, Mich., a corporation of Delaware
No Drawing. Filed Feb. 18, 1959, Ser. No. 793,987
18 Claims. (Cl. 71—27)

This invention relates to plant growth and is particularly concerned with a novel and improved medium for the growth and propagation of pot plants and a method for the production thereof.

The term "pot plants" is used herein to distinguish those plants grown in smaller quantity such as in aesthetical applications, or grown for resale in smaller units such as in greenhouse operations from those grown in large agricultural operations, and may be, for example, rose cuttings, tomato plants, gladiola bulbs, and plants grown from seeds.

In the growth and propagation of pot plants, the plants are generally provided with a matrix, that is, a medium which acts as a foundation for the plant roots and thereby as a foundation for the plant. Known matrices for plants include medium such as soil, sand, rocks, or inert particles. In some instances, rather than providing the plant with a matrix, the plant proper is supported by some means while its roots are immersed in a nutrient solution. Such method is known as hydroponic or nutrient culture.

While these methods are operable there are certain inherent drawbacks. For example, the layman who is not a skilled horticulturist, ordinarily does no more than add a commercial fertilizer to top soil or soil from a sub-surface strata which serves as a pot plant matrix, and may therefore be unable to achieve maximum productivity, or may suffer plant damage or loss through over-fertilization or inadequate care. On the other hand, the horticulturist or nurseryman must treat pot plant soils of this nature to increase the productivity by blending in mulch agents to improve porosity and water retaining capacity, by applying fertilizers and special nutrient solutions, and by applying certain microbicidal and insecticidal compositions. Such operations, while beneficial for obtaining soil compositions suitable for optimum growth, are time consuming and usually require much labor and expense.

In the nutrient culture method, exactness is required in preparing and maintaining the nutrient solution. While operations of this nature could be of value particularly to military and expeditionary groups stationed in places without soil as a means for providing fresh vegetables, the exactness and continuous skilled care required renders such operations impractical.

In another method of soilless culture where inert material is mixed or impregnated with fertilizer or nutrient salts, such nutrients are subject to loss through leaching, resulting ultimately in plant loss or damage, or continuous, exacting care must be provided to prevent such loss or damage.

It is an object of this invention to provide a plant growth medium which requires neither soil nor exacting care to provide good plant growth. It is an object of the present invention to provide a stable nutrient-containing foamed matrix for growing plants. Another object is to provide a plant matrix requiring only the addition of water to sustain plant growth for several growing seasons. Another object is to provide a plant matrix which requires no initial heat or chemical treatment by the grower to render it free from harmful bacteria and insects. And still another object is to provide a matrix for plants which is light for shipping purposes and in which plants can be grown with minimum maintenance. Another object is to provide a matrix for plants which is unitary in structure and does not require matrix supporting containers. A still further object is to provide a matrix for plants whereby plants growing therein may be transported and transplanted without suffering from shock usually accompanying such transplanting processes. A further object is to provide a method of soilless plant growth which constitutes a major improvement over known methods. Other objects will appear from the following specification and claims.

It has been discovered that when polymeric materials which are foamable to form a stable open-celled foam structure are mixed with plant nutrients in chemical combination with a water-insoluble ion exchange resin and thereafter foamed, a stable synthetic water-insoluble foamed product results which provides a unitary plant growing medium for intensive plant culture. This growing medium requires no added nutrients, soil or other plant supporting matrix. It supports good plant growth without exacting care and requires only watering. It is adaptable to small household or larger greenhouse, garden or decorative operations.

The present invention has advantages over other known methods for growing plants employing an inert matrix and nutrients in that (1) the nutrients are not subject to loss through leaching and (2) the matrix is unitary in structure. By "unitary" is meant that the matrix and nutrient needed for supporting plant growth constitutes a composite unit. Thus, for use for pot plants, it constitutes a single unit and need not be shredded prior to use. For large greenhouse operations, several sections each constituting a single unit may be employed. This has the advantage of being transportable and maintaining a desired shape with or without the plant and without supporting containers or vessels. It provides a rooting media for cuttings which may be shipped without drying out or being damaged. Furthermore, since roots penetrate the foam, small plants can be grown in small blocks of foam and then be planted as a unit. Thus, plants can be transplanted without shock usually accompanying transplanting processes.

Polymeric materials suitable in the practice of the present invention are those known in the art to produce open-celled foam structure and include such materials as polyurethane, rubber and vinyl resins. The invention is particularly concerned with a matrix prepared from the three major classes of resins known to produce open-celled foam structure, namely, the polyurethanes, the rubbers and the vinyl foams, but includes all resins foamable to an open-cell foam and embraces all the variations and modifications well known and widely used in plastics technology as well as certain other modifications particularly desirable with regard to the present use as hereinafter more fully described.

The expression "stable foam" as herein employed is meant that the foam structure is stable, water-insoluble, and not short-lived. It refers to foam as is known in the plastics art. The foam must be water-insoluble to prevent clogging of the cells with a subsequent reduction in porosity. By "open-celled foam structure" as herein employed is meant that at least part of the foam must be open-celled, i.e., having interconnecting cells. Although a completely open-celled foam is preferred, it is not to be construed that foams containing a certain amount of closed cells cannot be used. It is considered that the foam must contain at least 20 percent open-cell structure to permit unhindered root growth and contact with the nutrient charged resins imbedded therein.

By "plant nutrients" is meant the macronutrients essential to plant growth: calcium, nitrogen, phosphorus, sulfur, potassium and magnesium. The invention also embraces the addition of micronutrients: boron, manganese, iron, zinc, molybdenum and copper which are necessary for intensive plant growth. These nutrients are supplied in chemical combination with water-insoluble synthetic ion exchange resins.

The expression "synthetic ion exchange resin" as herein employed means a polymeric material having the capacity to exchange ions with the surrounding medium and embraces natural materials which have been modified by chemical treatment to produce ion exchange properties as well as completely synthetic material. It is inclusive of weak and strong cation and anion exchangers as the terms are known in the art. An example of natural material modified by chemical treatment to provide exchange properties is sulfonated coal. Examples of completely synthetic ion exchange resins are those having a polymeric skeleton such as phenol-formaldehyde, polystyrene, polyolefins, olefin-maleic anhydride copolymers, polyoxyalkylene and polyalkyleneimine compounds and the like and containing acidic and basic groups capable of exchanging cations and anions. Cation exchangers generally contain the groups —OH, —COOH, —PO(OH)$_2$ or —SO$_3$H. It is understood that the above are the fundamental groups present on the exchanger and that the exchanger may have another cation in place of the hydrogen, said hydrogen or cationic group being replaceable by the particular cation to be employed in carrying out the present invention. Anion exchangers generally contain primary, secondary or tertiary amino groups or quaternary ammonium groups. Anion exchangers having amino groups are those capable of forming addition complexes with an acid having the desired anionic group. Quaternary ammonium anion exchangers have a hydroxyl or other anionic group which is exchangeable with the particular anion to be employed in supplying the nutrient.

"Water-insoluble" as employed in the expression "water-insoluble synthetic ion exchange resin" refers to resins having such physical properties that they do not form either true or colloidal solutions in water. In the practice of this invention, it is desirable that the resin be of 100 mesh size or greater, that is, that substantially all of the resin is of a size such as to be retained on a standard sieve having 100 meshes per inch.

The nitrogen is supplied as nitrate, NO$_3^-$, in chemical combination with an anion exchange resin, although a portion of the nitrogen may be supplied as ammonium, NH$_4^+$, in chemical combination with a cation exchange resin. Generally, when ammonium is employed together with nitrate as a source of nitrogen, it is preferable that only up to one-half of the nitrogen be supplied as ammonium. The phosphorus is supplied as orthophosphate in chemical combination with an anion exchange resin. By "orthophosphate" is meant the mono-, di- and trivalent radical of orthophosphoric acid: H$_2$PO$_4^-$, HPO$_2^=$, or PO$_4^\equiv$, respectively. Usually the resin carries a mixture of these radicals. Potassium, magnesium and calcium are supplied as K$^+$, Mg$^{++}$ and Ca$^{++}$ in chemical combination with a cation exchange resin. Sulfur is supplied as SO$_4^=$ in chemical combination with an anion exchange resin.

The nutrients are preferably supplied in such amounts as to provide a 1 to 1 ratio in milliequivalents of total anions and cations. The cations may be supplied in the following mixtures:

| Cation-Resin Component | Milliequivalent Percent | |
|---|---|---|
| | Operable | Preferred |
| K-Cation exchange resin | 1–60 | 15–15 |
| Ca-Cation exchange resin | 1–90 | 55–65 |
| Mg-Cation exchange resin | 1–60 | 10–20 |

The anions may be supplied in the following mixtures:

| Anion-Resin Component | Milliequivalent Percent | |
|---|---|---|
| | Operable | Preferred |
| NO$_3$-Anion exchange resin | 1–60 | 25–35 |
| SO$_4$-Anion exchange resin | 1–90 | 50–60 |
| Orthophosphate-Anion exchange resin | 1–75 | 10–20 |

The above mixture is to be supplied in such amounts as to provide from 1 to 15 percent by volume of the resin to the finished foam, the lower levels, preferably about 2.5 percent, being employed where plants are grown for bedding purposes and the higher levels, preferably from 10 to 12.5 percent, being employed where plants are to be maintained intact for an extended period.

The exact weight or volume of ion exchange resin-bearing nutrients to be used depends on the particular ion exchange resin and the particular foamable polymer. The amount of ion exchange resin necessary to supply a particular milliequivalent percent may be determined from the known exchange capacity of the ion exchange resin employed. The total capacity of the resin is generally expressed in milliequivalents per gram dry weight or milliequivalents per milliliter of water-swollen resin.

$$\frac{\text{Amount of cation or anion nutrient desired in milliequivalents}}{\text{Capacity of ion exchange resin}} =$$

Amount of ion exchange resin to be employed

From this relationship the exact amount of nutrient charged resin required to supply the desired milliequivalents proportion of cations and anions may be readily calculated.

The amount of nutrient charged ion exchange resin required to provide from 1 to 15 percent by volume of the finished foam depends on the particular foam and conditions under which they are produced. In general, from 7 to 54 parts by weight of resin are added to 100 parts by weight of foamable polymer mixture for the production of polyurethane foam matrix; from 4 to 28 parts by weight for the production of a vinyl foam matrix; and from 2 to 14 parts by weight for the production of a rubber foam or sponge matrix.

The micronutrients iron, manganese, copper and zinc are supplied as Fe$^{++}$, Mn$^{++}$, Cu$^{++}$ and Zn$^{++}$ in chemical combination with cation exchange resins. The micronutrients boron and molybdenum are supplied as B$_4$O$_7^=$ and MoO$_4^=$ in chemical combination with anion exchange resins. The micronutrients may be supplied in the following operable and preferred mixtures:

| Micronutrient Resin Component | Milliequivalent Percent | |
|---|---|---|
| | Operable | Preferred |
| Fe-Cation exchange resin | 1–60 | 34–44 |
| Mn-Cation exchange resin | 1–30 | 14–24 |
| Cu-Cation exchange resin | 1–5 | 2 |
| Zn-Cation exchange resin | 1–5 | 2 |
| B$_4$O$_7$-Anion exchange resin | 1–30 | 14–24 |
| MoO$_4$-Anion exchange resin | 1–30 | 14–24 |

The above mixture is supplied in an amount of from 0.01 to 1.0 percent by weight of the total of macro- and micronutrient charged ion exchange resins employed. The preferred amount is 0.5 percent by weight of the macro-+micronutrient resin mixture.

The resin mixture to be employed in practicing this invention may be prepared by methods commonly known in ion exchange technology. These methods are described in "Dowex::Ion Exchange," a publication of The Dow Chemical Company, 1958, pages 18–22.

The unitary plant growing medium comprising a foamed polymer and nutrient charged resin is prepared by mixing together a foamable polymeric material and the nutrient charged resin and thereafter foaming according to procedures well recognized by those skilled in the art. By "nutrient charged resin" is meant nutrients in chemical combination with ion exchange resins as hereinbefore described. Those polymer foams which required curing to form a stable foam are thereafter heated at the temperature for the time prescribed for particular resin foam. The foaming may be carried out in any suitable mold or vessel and may be in the finally desired shape or may be subsequently cut to the desired shape.

The preferred foam matrix according to the present invention is a polyurethane or modified polyurethane foam matrix wherein a polyester or polyether resin, diisocyanate, nutrient charged ion exchange resin, modifying agent (if employed) and a foaming catalyst comprising a water-catalyst mixture are reacted together according to any of the three foam-producing methods or modifications thereof. Suitable polyesters or polyethers include polybutylene glycols, polypropylene glycols, mixed polypropylene-polyethylene glycols sold under trade names as "Polyglycol B series or P series" (products of The Dow Chemical Company), diethylene glycol-adipic acid polyesters and caprolactone polyesters. Suitable diisocyanates include toluene diisocyanate, 1-chloro-2,4-phenylene diisocyanate, m-phenylene diisocyanate, p-phenylene diisocyanate, 4,4'-methylenebis(phenyl isocyanate) and 3,3'-dimethoxy-4,4'-biphenylene diisocyanate. Suitable catalysts are tertiary amines such as N-methylmorpholine, diethylethanolamine, etc. Modifying agents include oil-soluble dyes and pigments, cross-linking agents such as ethylene glycol, di- and triethylene glycol to provide more rigid structure, cell-size regulator such as Dow Corning Silicone Fluid, etc.

One method and the preferred method of preparing a nutrient charged foam matrix according to the present invention is the prepolymer method of producing foam. According to this method a polyether or polyester and a diisocyanate are heated together at a temperature in the range of from about 50° C. to about 120° C. for such time and in such proportions as to produce a liquid prepolymer product. The exact time required varies with the temperature and relative amounts of the component polymers but is generally considered to be from about 2 to 4 hours. Suitable ratio of component polymers to produce a foamable prepolymer is from about 80 to 60 parts by weight of polyester or polyether to about 20 to 40 parts by weight of diisocyanate.

To the prepolymer thus formed, nutrient charged resins and water-catalyst mixture are added to produce a foamed polyurethane polymer containing and intimately imbedded therein plant nurtients in chemical combination with ion exchange resins. A typical water-catalyst mixture has the following composition:

| | Parts by weight |
|---|---|
| N-methylmorpholine | 5 |
| Triethylamine | 1 |
| Triethylenediamine | 1.5 |
| Water | 11.7 |

The water-catalyst mixture is added in an amount of from about 2 to 5 percent by weight of the total weight of the polymer mixture. The nutrient charged ion exchange resins are added in an amount of about 40 to 100 percent by weight of the total weight of the polymer mixture. The foam produced may be cured, if necessary or desired, by heating at 70° C. to 100° C. for from 0.5 to 1 hour.

In an alternative method, the semi-prepolymer foaming method, the ester or ether resin and diisocyanate proportions are altered so that reaction is not complete during the heating process. The proportion of the ester or ether is from about 70 to 50 parts by weight to about 30 to 50 parts by weight of diisocyanate. Alternatively, the same proportions of the ester or ether to diisocyanate may be employed as for the prepolymer method but the mixture is allowed to stand at room temperature for an hour or so before any further additions are made. Thereafter, the nutrient charged ion exchange resins are added and mixed, then the water-catalyst mixture added and mixed together to produce a polyurethane foam matrix containing nutrient charged ion exchange resins.

In a third method, known in the polyurethane art as the "one shot technique," the polyester resin, the diisocyanate, the nutrient charged ion exchange resins and the water-catalyst mixture are mixed together to produce a polyurethane foam matrix containing nutrient charged ion exchange resins.

Other modifications of the foaming procedure as known in the art and described in such publications as "Polyurethanes" by Bernard A. Dombrow, Reinhold Publishing Corporation, 1957, may be employed.

The term "modified polyurethane" refers to that in which the physical properties particularly the rigidity, has been modified by the addition of cross-linking agents. The cross-linking agent is added prior to the addition of the water-catalyst mixture.

When the foam polymer matrix is to be derived from a vinyl resin, the foamed matrix containing nutrient charged ion exchange resins may be prepared by mixing a foamable vinyl polymer, nutrient charged ion exchange resins and foaming agent. The latter may be a chemical agent in which case an atmospheric blow technique is employed or may be an inert gas in which case a mechanical blow technique is employed. Such techniques are described in plastics publications as "Modern Plastics Encyclopedia," volume 35, pages 338–339 (1957), or volume 36, pages 332–333 (1959). By "vinyl resin" is meant polyvinyl chloride resin or a copolymer resin consisting chiefly of vinyl chloride.

When employing the atmospheric blow technique, the vinyl resin, plasticizer, nutrient charged ion exchanges and blowing agent are mixed together and the mixture fused in a suitable vessel at a temperature of from 330° to 400° F. and then allowed to expand at atmospheric pressure. A representative recipe suitable for such a process is as follows:

| | Parts by weight |
|---|---|
| Polyvinyl chloride resin (average molecular weight about 100,000) | 100 |
| Diisooctyl phthalate | 100 |
| Dipropylene glycol dibenzoate | 20 |
| Dibasic lead phthalate | 3.0 |
| 1,1'-azobis(formamide) (blowing agent) | 0.5–1.5 |
| Nutrient charged ion exchange resins | 40 to 100 |

Modifiers such as dyes may be added to the above composition as previously described.

When employing the mechanical blow technique, the nutrient charged ion exchange resins are added to and intimately admixed with a foamable vinyl resin mixture (plastisol) in a pressure vessel and carbon dioxide or other inert gas is introduced under pressure until the pressure in the container reaches approximately 100 to 800 pounds per square inch, the mixture agitated and then discharged into a vessel in the form of a stable expanded creamy foam.

The composition may be varied as is known to those skilled in the art and found in such publications as the Modern Plastics Encyclopedia, and/or by the addition of dye, etc as previously set forth for foamed polyurethane matrixes.

When the foamed polymer matrix is to be derived from rubber, the nutrient charged resins are added to a foamable mixture of rubber as described in "Latex in Industry" by Noble, Rubber Age, 2nd Edition, 1953, pages 603–613, inclusive. The expression "foamed polymer matrix" as applied to rubber embraces both rubber matrix obtained by sponge making process and rubber foam making process. The rubber employed may be either natural rubber or GR–S type latex or a combination thereof or other synthetic rubber prepared according to the teachings described in the above reference or in other sources in the art. The rubber or latex is compounded with the nutrient charged ion exchange resins together with accelerator, vulcanization agents, foaming agents, stabilizers, gelling agents, modifying agents, etc. and then mixed, whipped or otherwise aerated, to produce a foam of any desired degree then placed in a mold and subjected to vulcanization temperature of 205° to 210° F. for a period of 20 to 50 minutes, or to other known vulcanizing conditions such as steam curing at 5 to 45 pounds pressure or high frequency radiation curing. The nutrient charged foamed matrix is then removed from the mold, washed and dried.

A representative foamable composition for producing a rubber matrix in intimate admixture with nutrient charged resins has the following composition:

| | Parts by weight (dry weight) |
|---|---|
| COPO–1505 [1] | 100 |
| Carbon black (filler) | 20 |
| Dioctyl phthalate (plasticizer) | 13.3 |
| Ammonium carbonate (blowing agent) | 10 |
| Sulfur (vulcanizing agent) | 2 |
| Zinc oxide (activator for accelerator) | 3 |
| Mercaptobenzothiazole (accelerator) | 3 |
| Stearic acid (activator for accelerator) | 1.5 |
| Nutrient charged ion exchange resins | 20 |

[1] COPO–1505 is a synthetic rubber composed of 70 percent butadiene–30 percent styrene, and made by the Copolymer Rubber and Chemical Corporation of Louisville, Kentucky. It is prepared by emulsion polymerization at 41° F. in a resin soap aqueous emulsion using a free radical catalyst (peroxide) and benzylmercaptan as a "short stop" for the polymerization.

The components are intimately blended together and vulcanized to produce a foamed or sponge rubber matrix having intimately admixed and imbedded therein nutrient charged ion exchange resins.

The foamed matrix prepared as above described and further illustrated in the examples has a permanent open-celled structure thereby permitting rapid root growth with the roots coming into intimate contact with the nutrient charged ion exchange resins. The permanent open-cell structure provides excellent water retention properties to the matrix and avoids the necessity of blending in mulch agents. Furthermore, the amount of water retained by the matrix may be controlled. If excess water is administered, the excess may be squeezed out without damage to the roots. The foam matrix may be in the shape of a flower pot, cube, sphere, sheet, etc.

The foamed matrixes may be further modified by adding an inert compound having a high water-holding capacity. Compounds having this property greatly increase the water retention of the finished matrix. "Popped perlite" or "expanded perlite," a siliceous volcanic glass, primarily an expanded aluminum silicate capable of holding four times its weight in water, has proved to be exceptionally desirable in this application. When such agents are added, such addition must be made at least simultaneously with or preferably prior to the addition of the water-catalyst mixture to the foamable resin-nutrient charged resin mixture.

The plant matrices prepared as described above are free from nematodes, insects and other plant infesting insects and require no fumigation or sterilization. The matrix is completely clean and light and can be easily transported. The flexible foam type matrix in particular lends itself to transportation since it can be compressed for shipment. In use, the matrix is planted or seeded in the usual manner such as forming a hole or core and needs only the addition of water to promote plant growth. There is no danger of over-fertilizing as the nature of the matrix is such that the nutrient therein is released to the plant only as needed by the plant.

The unitary plant growth media of the present invention may be further modified or adapted in many ways. Thus, a self-containing unit requiring no water-retainer may be prepared with certain foams such as vinyl-resin foam by spraying, slush molding or brushing an unexpanded plastisol against a preheated mold surface, thereafter pouring the foam into the mold and curing the entire assembly, cooling and thereafter stripping the entire unit. The resulting product has its own skin which is not only integral with the foam but may be prepared to have a desired surface design or color. In a similar manner, a mold may be coated with a polyurethane prepolymer, the latter cured to a film and thereafter the polyurethane foamed in the coated mold. Alternatively, the outer surfaces of the foamed matrix may be coated with any water-impervious film for retaining water.

If desired, plant hormones and other growth-promoting agents may be added simultaneously with the nutrient charged resin. In addition, if the polymer matrix is to be employed for plants which are ultimately destined for field transplantation where there is high susceptibility to infestation or infection, microbicides, insecticides or other biocides may also be added prior to the foaming process.

The following examples illustrate the present invention but are not to be construed as limiting.

*Example 1*

A polyurethane prepolymer was prepared by heating a mixture of 74.2 percent by weight of polypropyleneglycol and 25.8 percent by weight of toluene diisocyanate. The polypropyleneglycol employed had a molecular weight of about 3,000 and was prepared by reacting propyleneglycol with propylene oxide. The toluene diisocyanate was an 80/20 mixture of the 2,4- and 2,6- isomers.

The prepolymer thus prepared was modified by adding and mixing commercial silicone oil (Dow Corning 200 50 oil) in an amount of 0.6 percent by weight. 90 grams of the modified prepolymer were intimately mixed with 69 grams of nutrient charged ion exchange resin in a plastic container. The mixture was foamed by adding in bulk and briefly stirring, a water-catalyst mixture having the following composition:

| | Grams |
|---|---|
| N-methylmorpholine | 0.9 |
| Triethylamine | 0.18 |
| Triethylenediamine | 0.27 |
| Water | 2.1 |

The nutrient charged ion exchange resin composition employed was a mixture having the following proportion of nutrient charged anion exchange resins:

| | Parts by weight |
|---|---|
| $SO_4$-anion exchange resin | 55 |
| Orthophosphate-anion exchange resin | 15 |
| $NO_3$-anion exchange resin | 30 | and the following proportion of nutrient charged cation exchange resins:

| | Parts by weight |
|---|---|
| K-Dowex 50 | 60 |
| Ca-Dowex 50 | 60 |
| Mg-Dowex 50 | 20 |

The anion exchange resin employed was a water-insoluble anion exchange resin obtained by the reaction of epichlorohrydrin with anhydrous ammonia and having principally primary amino groups for exchanging anions; Dowex 50 is a commercial sulfonic acid cation exchange resin, product of The Dow Chemical Company.

The resulting foam had excellent cell structure and the nutrient charged ion exchange resins were well distributed throughout.

Example 2

A polyurethane prepolymer was prepared as described in Example 1. 230 grams of prepolymer and 0.25 gram of Cadmium Selenide Red (an oil-soluble red dye, a product of Kentucky Color and Chemical Company) were mixed together in a plastic container. After the dye and prepolymer were well mixed, 200 milliliters of macronutrient-charged ion exchange resins having the composition described in Example 1 and 1.0 gram of micronutrient charged ion exchange resins having the composition given below were added to the polymer mixture and throughly mixed.

| | Parts by weight |
|---|---|
| Fe-Dowex 50 | 20 |
| Mn-Dowex 50 | 10 |
| Cu-Dowex 50 | 1 |
| Zn-Dowex 50 | 1 |
| $MoO_4$-Dowex 2[1] | 1 |
| $B_4O_7$-Dowex 2[1] | 10 |

[1] Commercial quaternary ammonium anion exchange resin, product of The Dow Chemical Company.

A water-catalyst mixture having the following composition was prepared:

| | Parts by weight |
|---|---|
| N-methylmorpholine | 1.0 |
| Triethylamine | 0.2 |
| Triethylenediamine | 0.3 |
| Water | 2.3 |

8.9 milliliters of the water-catalyst mixture was added to the prepolymer-nutrient resin mixture and stirred for 30 seconds. The mixture began to foam immediately and the foaming mass was poured into a 2-liter flower pot whereupon the foam filled the pot. The foam was cured by heating in an oven for ½ hour at 70° C. and thereafter removed from the flower pot.

The red polyurethane foam thus produced was flexible, of good cell structure and had the nutrient charged ion exchange resins well distributed throughout. Approximately ½ inch of the top of this flower pot shaped foam was cut off, a criss-cross 4 inches deep was made in the center topside, and an ivy plant inserted therein. The foam was placed in a ceramic container of approximately 1 inch depth and water was applied at the top in such quantity to wet the foam without providing standing water in the container. Thereafter, the foam containing the plant was placed in a fluorescent lighted display case in a room maintained at 73° F. and 40 percent relative humidity and watered weekly. At the end of two months, the plant had approximately tripled in size.

Example 3

A blue flower-spot-shaped, foamed polyurethane matrix suitable for growing plants was prepared in a manner similar to that described in Example 2 employing the following materials:

| Component: | Amount |
|---|---|
| Polyurethane prepolymer mixture | 225.0 grams. |
| Macronutrient charged ion exchange resin [1] | 275 milliliters. |
| Micronutrient charged ion exchange resin [1] | 1.0 gram. |
| Methylthionine chloride (blue dye) | 0.2 gram. |

Water-catalyst mixture:
N-methylmorpholine, 1.0 part by weight
Triethylamine, 0.2 part by weight
Triethylenediamine, 0.3 part by weight
Water, 2.3 parts by weight
} 8.8 milliliters.

[1] Composition same as that described in Example 2.

Example 4

A polyurethane prepolymer was prepared by heating 292 grams of a polypropyleneglycol having a molecular weight of about 2,000 and prepared by polymerizing propylene glycol with propylene oxide, with 108 grams of toluene diisocyanate.

A polyurethane foamed matrix having intimately imbedded therein nutrient charged ion exchange resins was prepared by a method similar to that described in Example 2 using the following materials:

| | Amount |
|---|---|
| Prepolymer | 180.0 grams. |
| Macronutrient charged ion exchange resin [1] | 200.0 milliliters. |
| Micronutrient charged ion exchange resin [1] | 1.0 gram. |
| Zulu Green [2] | 0.8 gram. |

Water-catalyst mixture:
N-methylmorpholine, 1.0 part by weight
Triethylamine, 0.2 part by weight
Triethylenediamine, 0.3 part by weight
Water, 2.3 parts by weight
} 7.0 milliliters.

[1] Composition same as that described in Example 2.
[2] An oil-soluble green dye, a product of Kentucky Color and Chemical Company.

The green flexible flower pot shaped foamed matrix thus produced had good cell structure and had the nutrient charged ion exchange resins well distributed throughout. A round core of ½ inch diameter and approximately 4 inches long was removed from the center, top side, of the foamed matrix, a philodendron plant inserted in the hole, the core returned, and water applied. The planted foamed matrix was placed in a hot house where the plant grew rapidly well.

Example 5

A white foamed matrix was prepared in a manner similar to that described in Example 2 but wherein expanded aluminum silicate was added to the mixture prior to foaming and the red dye was omitted. The following materials were used in the preparation:

| | Amount |
|---|---|
| Prepolymer | 90.0 grams. |
| Macronutrient charged ion exchange resin [1] | 75 milliliters. |
| Micronutrient charged ion exchange resin [1] | 1.0 gram. |
| Perlite | 17 milliliters. |

Water-catalyst mixture:
N-methylmorpholine, 1.0 part by weight
Triethylamine, 0.2 part by weight
Triethylenediamine, 0.3 part by weight
Water, 2.3 parts by weight
} 3.5 milliliters.

[1] Composition same as that described in Example 2.

The resulting foamed matrix has increased water retention properties.

Example 6

A polyurethane foamed matrix containing nutrient charged ion exchange resins was prepared according to the one shot technique employing the following materials:

| | Amount |
|---|---|
| Witco Fomrez No. 50 [1] | 63.0 grams. |
| Witco 77–86 [2] | 1.1 grams. |
| Nutrient charged ion exchange resins [3] | 50 milliliters. |
| Toluene diisocyanate | 21.2 milliliters. |

Water-catalyst mixture:
N-methylmorpholine, 0.9 gram
Triethylamine, 0.18 gram
Triethylene diamine, 0.27 gram
Water, 2.1 grams
} 3.5 milliliters.

[1] Witco Fomrez No. 50—a commercial polyester for the production of flexible polyurethane foams; product of Witco Chemical Company.
[2] Witco 77–86—a commercial cross-linking agent; product of Witco Chemical Company.
[3] The nutrient charged ion exchange resins (macro-+ micronutrient charged) had the same composition as that described in Example 2.

Witco Fomrez, Witco 77–86, macronutrient and micronutrient charged ion exchange resins and water-catalyst were mixed together. Toluent diisocyanate was added thereto and vigorously mixed for 15 seconds to produce a foamed polyurethane matrix containing nutrient charged ion exchange resins and suitable for growing plants.

Example 7

A yellow rigid foam was prepared from the following components:

| | Amount |
|---|---|
| Prepolymer | 90 grams. |
| N,N,N',N'-tetrakis(2-hydroxypropyl)ethylenediamine | 9.1 grams. |
| Macronutrient charged ion exchange resins [1] | 100 milliliters. |
| Micronutrient charged ion exchange resins [1] | 0.5 gram. |
| Cadmium Yellow Primrose [2] | 0.5 gram. |
| Water-catalyst mixture: N-methylmorpholine, 0.8 part by weight; Triethylenediamine, 0.25 part by weight; Water, 2.3 parts by weight | 3.6 milliliters. |

[1] The nutrient charged ion exchange resins had the same composition as that described in Example 2.
[2] An oil-soluble yellow dye, product of Kentucky Color and Chemical Company.

A polyurethane prepolymer having a viscosity of 40 strokes at 25° C. was prepared by heating at 65° C., 5,000 grams of glycerin initiated polypropylene oxide having a molecular weight of about 650, with 7,200 grams of toluene diisocyanate for approximately 2.5 hours.

The prepolymer, the nutrient charged ion exchange resins and dye were mixed together. In a separate operation, N,N,N',N'-tetrakis(2-hydroxypropyl)ethylenediamine and the catalyst mixture were mixed together. The two mixtures were then added together and mixed and poured into a flower pot mold to produce a yellow, rigid foam having an excellent cell structure and ion exchange resin dispersion which after curing by heating for 1 hour at 70° C. provided a suitable matrix for growing plants.

Example 8

The following ingredients were used in preparing a nutrient charged rubber foam:

| | Dry weight, grams |
|---|---|
| COPO–1505 (butadiene/styrene 70/30) [1] | 300 |
| Carbon black | 60 |
| Dioctyl phthalate | 40 |
| Ammonium carbonate | 30 |
| Sulfur | 6 |
| Zinc oxide | 9 |
| Mercaptobenzothiazole | 9 |
| Stearic acid | 4.5 |
| Nutrient charged ion exchange resins [2] | 60 |

[1] Product of Copolymer Rubber and Chemical Corporation.
[2] The nutrient charged ion exchange resins had the same composition as that described in Example 1.

The ingredients were thoroughly blended on a roll mill and thereafter heated in a rectangular mold at 300° F. for 25 minutes to produce a foamed matrix. The foamed matrix thus prepared is suitable for growing plants.

Example 9

A water-insoluble foamed vinyl matrix containing nutrient charged ion exchange resins is prepared by grinding together on a paint mill the following materials:

| | Amount |
|---|---|
| Marvinol VR–50 [1] | grams__ 100.0 |
| Diisooctyl phthalate | do____ 100.0 |
| Dipropylene glycol dibenzoate | do____ 20.0 |
| Dibasic lead phthalate | do____ 3.0 |
| 1,1'-azobis(formamide) | do____ 1.0 |
| Macronutrient charged ion exchange resins | millimeters__ 100 |
| Micronutrient charged ion exchange resins | gram__ 0.4 |

[1] Marvinol VR–50—a high molecular weight polyvinyl chloride resin; sp. gr. 1.40; product of Naugatuck Chemical Division, United States Rubber Company.

The nutrient charged ion exchange resin has the following composition:

| Macronutrients: | Parts by weight |
|---|---|
| Cation mixture— | |
| K-Dowex 50 | 20 |
| Ca-Dowex 50 | 60 |
| Mg-Dowex 50 | 20 |
| Anion mixture— | |
| $NO_3$-Dowex 2 | 30 |
| Orthophosphate-Dowex 2 | 15 |
| $SO_4$-Dowex 2 | 55 |
| Micronutrients: | |
| Fe-Dowex 50 | 39 |
| Mn-Dowex 50 | 19 |
| Cu-Dowex 50 | 2 |
| Zn-Dowex 50 | 2 |
| $B_4O_7$-Dowex 2 | 19 |
| $MoO_4$-Dowex 2 | 19 |

The vinyl resin-nutrient charged ion exchange resin mixture is then fused at about 350° F. and then poured into a rectangular shaped mold and allowed to expand at atmospheric pressure, to produce a foamed vinyl matrix containing nutrient charged ion exchange resins.

The foamed matrix thus prepared is stripped from the mold, placed on a tray, plugs of about ½ inch depth cut out on the upper surface at about 1 inch intervals and carnation seeds planted therein. The planted holes are covered with the plugs and the tray placed in a greenhouse maintained at 75°–80° F. and 40 to 80 percent relative humidity. The foamed matrix is watered daily whereupon the seeds germinate and plants start to grow. After about 13 weeks, carnations are found to be blooming.

Example 10

A water-insoluble foamed vinyl matrix containing nutrient charged ion exchange resins is prepared as described in Example 9 except that the macro- and micronutrients are supplied as a mixture of resins having the following composition:

| Macronutrients: | Parts by weight |
|---|---|
| Cation mixture— | |
| K-Permutit Q [1] | 20 |
| Ca-Permutit Q | 60 |
| Mg-Permutit Q | 20 |
| Anion mixture— | |
| $NO_3$-Amberlite IRA–45 [2] | 30 |
| Orthophosphate-Amberlite IRA–45 | 15 |
| $SO_4$-Amberlite IRA–45 | 55 |
| Micronutrients: | |
| Fe-Permutit Q | 39 |
| Mn-Permutit Q | 19 |
| Cu-Permutit Q | 2 |
| Zn-Permutit Q | 2 |
| $B_4O_7$-Amberlite IRA–45 | 19 |
| $MoO_4$-Amberlite IRA–45 | 19 |

[1] Permutit Q—a sulfonated styrene-type cation exchange resin having only —$SO_3H$ exchange group, product of Permutit Company.
[2] Amberlite IRA–45—weakly basic anion exchanger, amine exchange group, product of Rohm and Haas Company.

The foamed vinyl matrix thus prepared is placed on a tray and planted with rooted cuttings of ivy and placed in a greenhouse maintained at about 68°–75° F. and 60 to 90 percent relative humidity. The plants are watered weekly. After about 30 days, it is found that the plants are about 2 additional inches in height.

Example 11

A water-insoluble foamed rubber matrix containing nutrient charged ion exchange resins is prepared by mixing together the following:

| | Amount (dry weight) |
|---|---|
| COPO–1503 [1] | grams 100.0 |
| Sulfur | do 2.5 |
| Zinc mercaptobenzothiazole | do 1.0 |
| Mineral oil | do 5.0 |
| Phenyl-beta-naphthylamine | do 1.0 |
| Macronutrient charged ion exchange resins | milliliters 100.0 |
| Micronutrient charged ion exchange resins | gram 0.4 |
| Perlite | milliliters 15 |

[1] Product of Kentucky Color and Chemical Company.

The macronutrient charged resin has the following composition:

| Cation mixture: | Parts by weight |
|---|---|
| K-Zeo-Karb [1] | 20 |
| Ca-Zeo-Karb | 60 |
| Mg-Zeo-Karb | 20 |
| Anion mixture: | |
| $NO_3$-Dowex 3 [2] | 30 |
| Orthophosphate-Dowex 3 | 15 |
| $SO_4$-Dowex 3 | 55 |

[1] An organic cation exchanger, a sulfonated coal having —$SO_3H$, —COOH and —OH exchange groups, product of Permutit Company.
[2] An amine anion exchange resin, product of The Dow Chemical Company.

The micronutrient charged resin has the same composition as in Example 9.

*Example 12*

A polyurethane prepolymer was prepared and modified as described in Example 1. 240 grams of the modified prepolymer was intimately mixed with 165 grams of nutrient charged ion exchange resins in a plastic container. The mixture was foamed by adding a water-catalyst mixture as described in Example 1. The nutrient charged ion exchange resin composition employed was a mixture having the following proportion of macronutrient charged anion exchange resin:

| | Parts by weight |
|---|---|
| $SO_4$-Dowex 3 | 60 |
| Orthophosphate-Dowex 3 | 15 |
| $NO_3$-Dowex 3 | 25 | and the following proportion of macronutrient charged cation exchange resin:

| | Parts by weight |
|---|---|
| K-Dowex 50 | 20 |
| Ca-Dowex 50 | 60 |
| Mg-Dowex 50 | 20 |

Dowex 3 is a weakly basic anion exchange resin of the polyamine type, a commercial product of The Dow Chemical Company.

One gram of micronutrient charged ion exchange resin having the composition described in Example 2 was added to the above formulation. The resulting foam proved to be excellent plant growth media.

The ion exchange resins suitable in the practice of this invention are obtainable as commercial products or may be obtained by methods known in the art. Thus, cation exchange resins may be prepared, for example, by the condensation of phenol, phenolsulfonic acid and formaldehyde in the presence of sodium hydroxide as catalyst; the condensation of benzaldehyde-2,4-disulfonic acid, phenol, resorcinol and formaldehyde under acid or alkaline conditions; the condensation of cresol-ω-sulfonic acid with phenol and formaldehyde; treatment of a phenol-formaldehyde resin with formaldehyde and sodium sulfite; suspension polymerization of styrene and divinylbenzene followed by sulfonation; condensation of 1,3,5-resorcyclic acid with formaldehyde; or copolymerization of methacrylic acid with divinylbenzene in the presence of benzoyl peroxide. Anion exchange resins may be prepared, for example, by the treatment of cross-linked polystyrene chloromethyl ether in the presence of a Friedel-Crafts catalyst followed by treatment with ammonia, primary, secondary or tertiary alkyl or alkanolamine; amination of chlorinated copolymers of methyl or ethylstyrenes and divinylbenzene; reaction of phenylenediamine with formaldehyde; reaction of m-phenylenediamine and a polyethylenepolyamine with formaldehyde; reaction of phenol, a polyethylenepolyamine and formaldehyde; the reaction of epichlorohydrin with ammonia, the reaction of epichlorohydrin with polyalkylenepolyamine; condensation of acetaldehyde, formaldehyde and polyalkylenepolyamine; the reaction of melamine, guanidine and formaldehyde; or the condensation of guanidyl carbamide and urea with formaldehyde.

I claim:

1. A plant growth medium comprising a stable water-insoluble open-celled foamed polymer containing and intimately imbedded therein plant nutrients in chemical combination with water-insoluble synthetic ion exchange resins, said ion exchange resins having ions of plant nutrients exchanged thereon and wherein said nutrients are supplied in amounts of from 1 to 15 percent by volume of the ion exchange resin to the finished foam and to provide approximately 1:1 ratio in milliequivalents of total cations and anions and where the component cations are supplied in from 1–60 milliequivalent percent as K-cation exchange resin, 1–90 milliequivalent percent as Ca-cation exchange resin, 1–60 milliequivalent percent as Mg-cation exchange resin, and the component anions are supplied in from 1–60 milliequivalent percent as $NO_3$-anion exchange resin, 1–90 milliequivalent percent as $SO_4$-anion exchange resin and 1–75 milliequivalent percent as orthophosphate-anion exchange resin.

2. A plant growth medium comprising a stable water-insoluble open-celled foamed polymer containing and intimately imbedded therein plant nutrients in chemical combination with water-insoluble synthetic ion exchange resins, said ion exchange resins having ions of plant macro- and micronutrients exchanged thereon and wherein said nutrients are supplied in amounts of from 1 to 15 percent by volume of the ion exchange resin to the finished foam and to provide approximately 1:1 ratio in milliequivalents of total cations and anions and where the component macronutrient cations are supplied in from 1–60 milliequivalent percent as K-cation exchange resin, 1–90 milliequivalent percent as Ca-cation exchange resin, and 1–60 milliequivalent percent as Mg-cation exchange resin, and the component macronutrient anions are supplied in from 1–60 milliequivalent percent as $NO_3$-anion exchange resin, 1–90 milliequivalent percent as $SO_4$-anion exchange resin and 1–75 milliequivalent percent as orthophosphate-anion exchange resin, and the micronutrients are supplied in an amount of from 0.01 to 1.0 percent by weight of the total of macro- and micronutrient charged ion exchange resins employed in a mixture of 1–60 milliequivalent percent Fe-cation exchange resin, 1–30 milliequivalent percent Mn-cation exchange resin, 1–5 milliequivalent percent Cu-cation exchange resin, 1–5 milliequivalent percent Zn-cation exchange resin, 1–30 milliequivalent percent $B_4O_7$-anion exchange resin and 1–30 milli-equivalent percent $MoO_4$-anion exchange resin.

3. A unitary stable water-insoluble foamed polymer matrix suitable for growing plants containing in intimate admixture therewith plant nutrients in chemical combination with water-insoluble synthetic ion exchange resins having ions of plant nutrients exchanged thereon, wherein said polymer contains at least 20 percent open-celled structure and said nutrients are supplied in amounts of from 1 to 15 percent by volume of the ion exchange resin to the finished foam and to provide approximately 1:1 ratio in milliequivalents of total cations and anions and where the component cations are supplied in from 1–60 milliequivalent percent as K-cation exchange resin, 1–90 milliequivalent percent as Ca-cation exchange resin and 1-60 milliequivalent percent as Mg-cation exchange resin, and the anion components are supplied in from 1-60 milliequivalent percent as $NO_3$-anion exchange resin, 1-90 milliequivalent percent as $SO_4$-anion exchange resin, and 1-75 milliequivalent percent as ortho-phosphate-anion exchange resin.

4. A foamed polymer matrix according to claim 3 wherein said foamed polymer matrix is foamed polyurethane.

5. A foamed polymer matrix according to claim 3 wherein said foamed polymer matrix is polyurethane modified by the addition of cross-linking agents.

6. A foamed polymer matrix according to claim 3 wherein said foamed matrix is foamed rubber.

7. A foamed polymer matrix according to claim 3 wherein said foamed matrix is flexible polyurethane foam.

8. A foamed polymer matrix according to claim 3 wherein said foamed matrix is rigid polyurethane foam.

9. A unitary stable water-insoluble foamed polymer matrix suitable for growing plants containing in intimate admixture therewith plant nutrients in chemical combination with water-insoluble synthetic ion exchange resins having ions of plant macro- and micronutrients exchanged thereon, wherein said polymer matrix contains at least 20 percent open-celled structure and is suitable for growing plants and wherein said nutrients are supplied in amounts of from 1 to 15 percent by volume of the ion exchange resin to the finished foam and to provide approximately 1:1 ratio in milliequivalents of total cations and anions and where the component cations are supplied in from 1-60 milliequivalent percent as K-cation exchange resin, 1-90 milliequivalent percent as Ca-cation exchange resin, and 1-60 milliequivalent percent as Mg-cation exchange resin, and the anion components are supplied in from 1-60 milliequivalent percent as $NO_3$-anion exchange resin, 1-90 milliequivalent percent as $SO_4$-anion exchange resin, and 1-75 milliequivalent percent as ortho-phosphate-anion exchange resin, the micronutrients are supplied in an amount of from 0.01 to 1 percent by weight of the total of macro- and micronutrient charged ion exchange resins employed in a mixture of 1-60 milliequivalent percent as Fe-cation exchange resin, 1-30 milliequivalent percent as Mn-cation exchange resin, 1-5 milliequivalent percent as Cu-cation exchange resin, 1-5 milliequivalent percent as Zn-cation exchange resin, 1-30 milliequivalent percent as $B_4O_7$-anion exchange resin, and 1-30 milliequivalent percent as $MoO_4$-anion exchange resin.

10. A foamed polymer matrix according to claim 9 wherein said foamed polymer matrix is foamed polyurethane.

11. A foamed polymer matrix according to claim 9 wherein said foamed polymer matrix is polyurethane modified by the addition of cross-linking agents.

12. A foamed polymer matrix according to claim 9 wherein said foamed matrix is foamed rubber.

13. A foamed polymer matrix according to claim 9 wherein said foamed matrix is flexible polyurethane foam.

14. A foamed polymer matrix according to claim 9 wherein said foamed matrix is rigid polyurethane foam.

15. A unitary stable water-insoluble foamed polymer matrix containing in intimate admixture therewith (1) plant nutrients in chemical combination with water-insoluble synthetic ion exchange resins, and (2) expanded aluminum silicate, wherein said foamed polymer matrix contains at least 20 percent open-celled structure and said ion exchange resins have ions of plant nutrients exchanged thereon and are supplied in amounts of from 1 to 15 percent by volume of the ion exchange resin to the finished foam and to provide approximately 1:1 ratio in milliequivalents of total cations and anions and where the component cations are supplied in from 1-60 milliequivalent percent as K-cation exchange resin, 1-90 milliequivalent percent as Ca-cation exchange resin and 1-60 milliequivalent percent as Mg-cation exchange resin, and the anion components are supplied in from 1-60 milliequivalent percent as $NO_3$-anion exchange resin, 1-90 milliequivalent percent as $SO_4$-anion exchange resin and 1-75 milliequivalent percent as ortho-phosphate-anion exchange resin, said matrix being suitable for growing plants.

16. A foamed polymer matrix according to claim 15 wherein the foamed polymer matrix is polyurethane.

17. A unitary stable water-insoluble foamed polymer matrix containing in intimate admixture therewith (1) plant nutrients in chemical combination with water-insoluble synthetic ion exchange resins, and (2) expanded aluminum silicate wherein said foamed polymer matrix contains at least 20 percent open-celled structure and said ion exchange resins have ions of plant macro- and micronutrients exchanged thereon and are supplied in amounts of from 1 to 15 percent by volume of the ion exchange resin to the finished foam and to provide approximately 1:1 ratio in milliequivalents of total cations and anions and where the component cations are supplied in from 1-60 milliequivalent percent as K-cation exchange resin, 1-90 milliequivalent percent as Ca-cation exchange resin and 1-60 milliequivalent percent as Mg-cation exchange resin, and the anion components are supplied in from 1-60 milliequivalent percent as $NO_3$-anion exchange resin, 1-90 milliequivalent percent as $SO_4$-anion exchange resin and 1-75 milliequivalent percent as ortho-phosphate-anion exchange resin, the micronutrients are supplied in an amount of from 0.01 to 1.0 percent by weight of the total of macro- and micronutrient charged ion exchange resins employed and supplied in an amount of from 1-60 milliequivalent percent as Fe-cation exchange resin, 1-30 milliequivalent percent as Mn-cation exchange resin, 1-5 milliequivalent percent as Cu-cation exchange resin, 1-5 milliequivalent percent as Zn-cation exchange resin, 1-30 milliequivalent percent as $B_4O_7$-anion exchange resin and 1-30 milliequivalent percent as $MoO_4$-anion exchange resin, said matrix being suitable for growing plants.

18. A foamed polymer matrix according to claim 17 wherein the foamed matrix is polyurethane.

References Cited in the file of this patent

UNITED STATES PATENTS

| | | |
|---|---|---|
| 2,187,532 | Leatherman | Jan. 16, 1940 |
| 2,582,194 | Dudley | Jan. 8, 1952 |
| 2,625,471 | Mowry et al. | Jan. 13, 1953 |
| 2,753,277 | Smithers | July 3, 1956 |
| 2,779,670 | Burkett | Jan. 29, 1957 |
| 2,848,840 | O'Brien et al. | Aug. 26, 1958 |
| 2,891,355 | Nelson | June 23, 1959 |

OTHER REFERENCES

Arnon, D. I., et al.: "Nutrient . . . ion-exchange Materials," Soil Science, vol. 63, No. 3, March 1947, pages 159–182.

Tschirhart, W. E.: "Substitutes for Sand in Propagating Cuttings," Southern Florist and Nurseryman, vol. 65, No. 18, July 1952, pages 85–87.